INVENTOR.
VERN L. KAMMERZELL

Jan. 14, 1969  V. L. KAMMERZELL  3,421,303

BEAN HARVESTING ATTACHMENT FOR TRACTORS

Filed Oct. 15, 1965  Sheet 2 of 3

INVENTOR.
VERN L. KAMMERZELL
BY

Jan. 14, 1969   V. L. KAMMERZELL   3,421,303
BEAN HARVESTING ATTACHMENT FOR TRACTORS
Filed Oct. 15, 1965   Sheet 3 of 3

*INVENTOR.*
VERN L. KAMMERZELL
BY

United States Patent Office 3,421,303
Patented Jan. 14, 1969

3,421,303
BEAN HARVESTING ATTACHMENT FOR TRACTORS
Vern L. Kammerzell, Rte. 1, Box 65B, Milliken, Colo. 80543
Filed Oct. 15, 1965, Ser. No. 496,466
U.S. Cl. 56—229    8 Claims
Int. Cl. A01d 55/00; A01d 33/02; A01d 45/02

ABSTRACT OF THE DISCLOSURE

This invention relates to an improved bean harvesting machine that includes a transverse frame mounted on the front of a tractor that is raised and lowered between its operative and inoperative positions by a servo-motor powered from the tractor's hydraulic system. At least two subassemblies are mounted on the frame for relative transverse adjustment, each of said subassemblies including a vine-untangling unit that sweeps the tangled vines from the furrows preparatory to their being cut by the second part of the subassembly following along therebehind, namely, the cutter unit having rearwardly divergent generally V-shaped blades. Provision is made for adjusting the height of the vine-untangling unit relative to the cutter unit and for the whole subassembly relative to the ground so as to vary the depth of cut, the latter being accomplished by a second servo-motor operatively connected to a crank arm which raises and lowers a pair of ground wheels relative to the frame.

---

Of the many row-crops that grow above-ground, one of the most troublesome to harvest is beans. Beans grow on vines planted in parallel rows with a shallow furrow running therebetween. Most modern bean harvesters employ one or more horizontally-disposed blades or shares that are pulled along the ground at an oblique angle to the direction of travel and which functions to sever the haulm of the plant from the roots. The cut is usually made at or just beneath ground level and the severed plants are left in windrows alongside the cutter-bar by divergent fingers which sweep the vines from the furrow.

Bean vines, when ready for harvest, lay over into the adjacent furrows making it very difficult to move the harvesting machine through them without tearing the vines before they can be cut. The main problem, therefore, becomes one of sweeping the tangled vines clean of the furrow in which the cutter bars travel so that they can make a good clean cut.

The cutter bars or "shares" present somewhat of a problem also in that they become dull rather quickly and require frequent resharpening. One reason for this is that the beanstalks are thick near their roots placing a heavy burden on the cutting edge of the share. Perhaps more significant, however, is the fact that the blades are often moving through sandy soil, weeds, and against rocks all of which contribute to excessive blade edge wear.

Some other disadvantages of the prior art bean cutters are such things as the failure to provide for variations in row spacings, furrow depth and cutter bar adjustment, all of which are necessary in a well-designed harvesting machine of this type. The better units are also mounted for movement ahead of the tractor rather than being pulled because the front-mounted attachment can be guided more accurately, is easier to watch, and it accomplishes the desired cutting operation before the wheels can pass over the vines to crush and tangle them.

It has now been found in accordance with the teaching of the instant invention that the aforementioned shortcomings of the prior art bean harvesting machines can be eliminated or, at least, greatly improved upon. Among the novel features of the instant bean cutter is a unique "untangling plow" that moves along the furrow engaging the tangled vines and separating them into their proper rows preparatory to being cut. Two or more untangling bar and cutter bar subassemblies are mounted on a common frame for lateral adjustment to accommodate different row spacings. Each such subassembly is designed to pass down alternate furrows and cut the stalks in the adjacent rows on both sides thereof. Provision is also made for varying the depth at which the untangling plows ride in the furrows and the inclination of the cutter bars.

The main frame is attached to the front of the tractor with a "parallelogram" mount which enables the unit to be raised and lowered while remaining essentially horizontal. A simple hydraulic servo-motor powered by the tractor is used to raise and lower the attachment between its operative and inoperative positions.

The cutter blades are specifically hardened to produce a serrated edge that remains sharp a good deal longer than the ordinary knife-edged blade. A second hydraulic mechanism separate from that used to raise the unit into inoperative position is provided to adjust the running-height of the functional subassemblies relative to the ground.

It is, therefore, the principal object of the instant invention to provide a novel and improved bean harvester.

A second objective of the invention herein disclosed and claimed is the provision of a device of the character aforementioned that incorporates as a part thereof a unique "vine-untangling plow" that precedes the cutter bars down the furrow.

Another object is to provide a harvesting machine wherein each of the functional subassemblies is independently adjustable of the others while, at the same time, including simultaneous adjustment features that position them relative to the ground and the supporting frame.

Still another objective is the provision of a bean cutter that includes selectively-hardened cutter blades which wear during repeated use to produce a serrated cutting edge.

An additional object of the invention herein disclosed and claimed is to provide a vine-parting and cutter-bar subassembly that includes means for stacking the several stalks of "haulms" in windrowed relation atop the planting rows.

Further objects are to provide a bean harvesting attachment that is simple to operate, versatile, rugged, easy to service, one that is adaptable for attachment to various makes and sizes of farm tractors, a unit that includes hydraulic lift mechanisms for raising same into inoperative position and for controlling its movement over the ground, and an apparatus that accomplishes the harvesting operation without damaging the edible portion of the crop.

Other objects will be in part apparent and in part pointed out specifically hereinafter in connection with the description of the drawings that follows, and in which.

Figure 1:
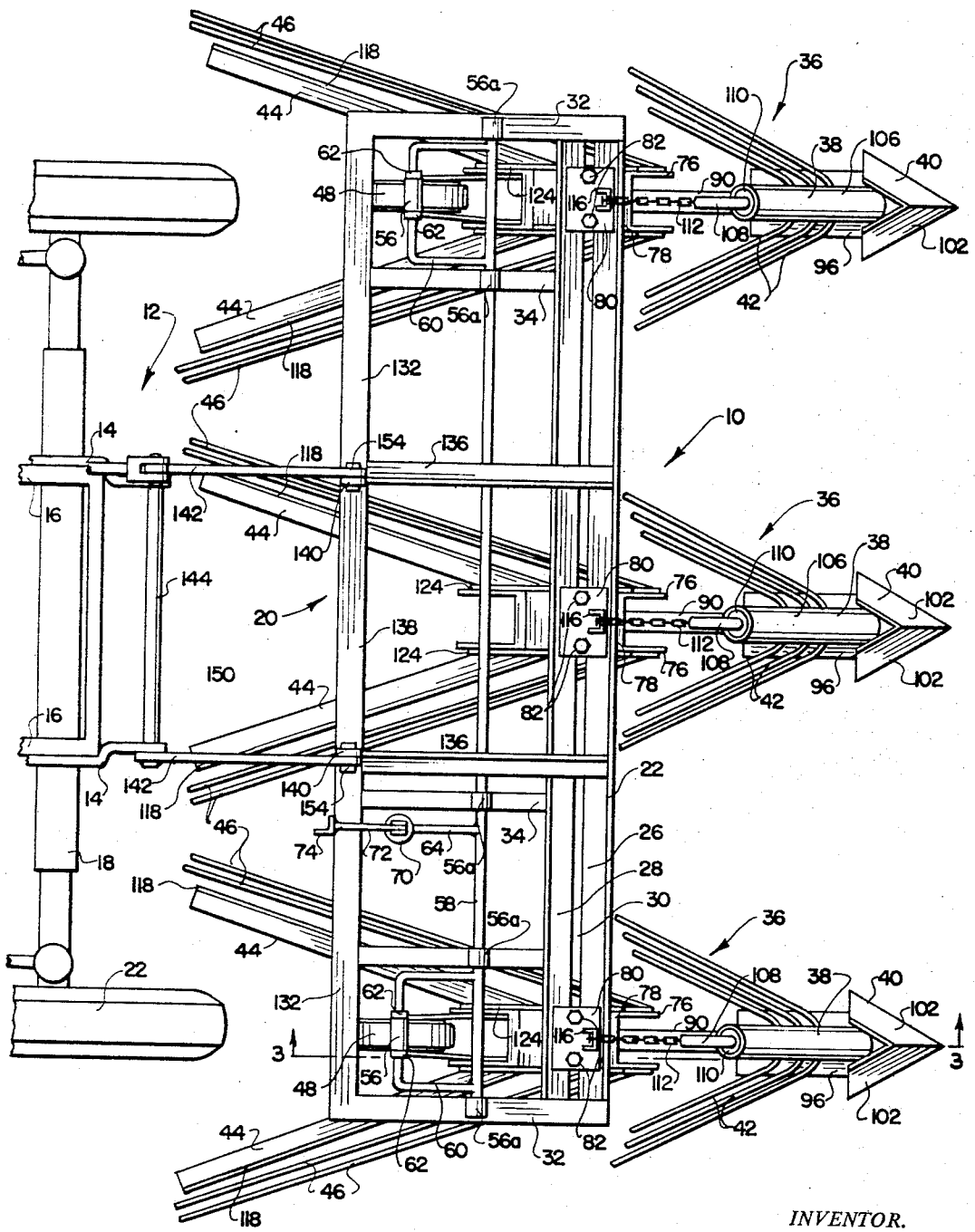
FIGURE 1 is a top plan view of the bean harvester showing it attached to the front end of a tractor, only portions of the tractor having been illustrated to conserve space.
Figure 2:
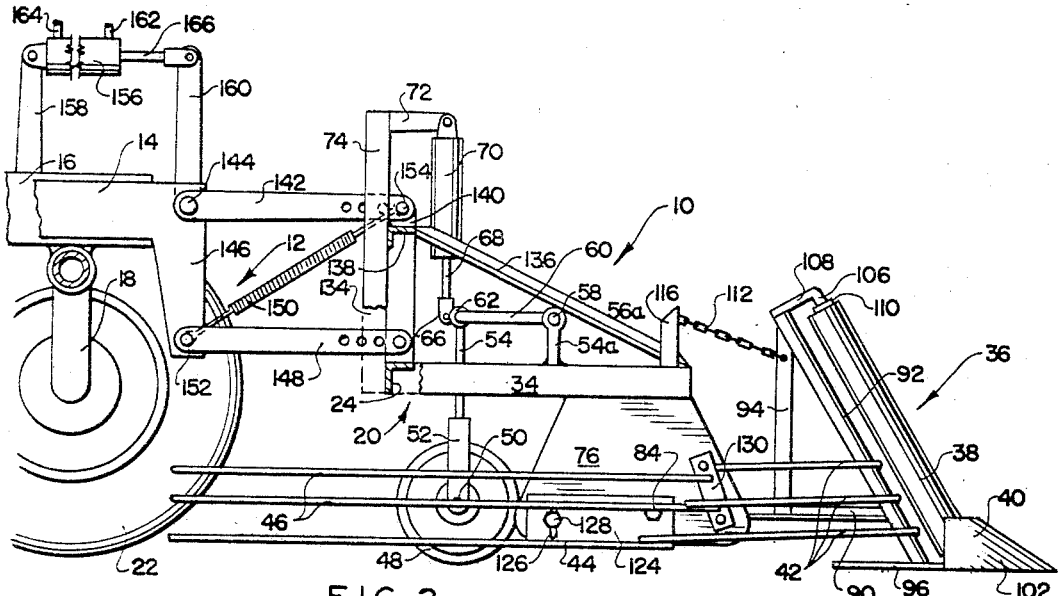
FIGURE 2 is a side elevation encompassing approximately the same structure shown in FIGURE 1, but with portions of the frame broken away and shown in section.

Referring now to the drawings for a detailed description of the present invention and, initially, to FIGURES 1 and 2 for this purpose, the bean cutter which has been broadly designated by reference numeral 10 is shown mounted in place on the front end of an ordinary farm tractor indicated in a general way by reference numeral 12. Specifically, a pair of inverted L-shaped mounting brackets 14 are welded or otherwise permanently attached in transversely-spaced essentially parallel relation to suitable elements 16 of the tractor frame which rest on the axle housing 18, and these brackets provide the means by which the cutter frame (broadly designated by numeral 20) is attached to the tractor in a manner to be pushed thereby. Thus, the cutter unit 10 is positioned as shown ahead of the front steerable wheels 22 and is preferably centered relative thereto.

Cutter frame 20 includes a transversely elongate rectangular frame unit 22 made up from rear horizontal element 24, a pair of front horizontal elements 26 and 28 spaced apart to define a slotted track 30 therebetween, and endpieces 32 and braces 34 spanning the distance separating the front and rear elements so as to interconnect same. Suspended from the underside of frame unit 22 for transverse adjustment to accommodate different row-spacings are the functional assemblies that have been indicated in a general way by reference numeral 36 and each of which includes the vine-untangling elements 38, 40 and 42; cutter bars 44; and the windrowing fingers 46, all of which will be described in more specific detail presently. The positions at which these subassemblies move along the planted fields in relation to the ground is basically controlled by vertically-adjustable wheels 48 which support the cutter frame 20 for rolling movement although, as will be explained, a number of elements of these subassemblies are independently adjustable relative to one another.

Wheels 48 are journalled for rotation on axles 50 that bridge the legs of inverted U-shaped yokes 52. Posts 54 attached to the top of each yoke 52 project upwardly through frame unit 22 and into one of the outboard rectangular openings defined by endpieces 32, the adjacent braces 34 and horizontal elements 24 and 28. Sleeves 56 are mounted atop these posts in substantially coaxial transverse alignment. A series of similar transversely-aligned posts 54a and sleeves 56a are carried atop the endpieces 32 and adjacent braces 34, journalling transverse crank rod 58 for rotation parallel to but spaced forwardly of the first-mentioned set of posts and sleeves 54 and 56. U-shaped yokes 60 fixedly attached adjacent opposite extremities of crank rod 58 pass through the sleeves 56, the latter elements being held in the desired position on the lateral portion of said yokes by collars 62 as shown in FIGURE 1. Crank rod 58 also carries a crank arm 64 fixedly attached thereto and extending rearwardly therefrom. The free end of the crank arm is pivotally attached within clevis 66 (FIGURE 2) carried on the lower end of the piston rod 68 of hydraulic servo-motor 70 which is, in turn, pivotally attached to the forward end of bracket 72 mounted on an upright 74 fastened to the rear transverse element 24 of the frame.

Servo-motor 70 is connected by suitable conduits (not shown) to the tractor's hydraulic system and it functions upon actuation to raise and lower wheels 48 thus adjusting the cutter frame 20 and the functional assemblies carried thereby relative to the ground. It becomes apparent, therefore, that the operator can control the working attitude of the cutter while moving through the fields so as to accommodate variations in ground contour, cutting depth, etc.

Figure 3:
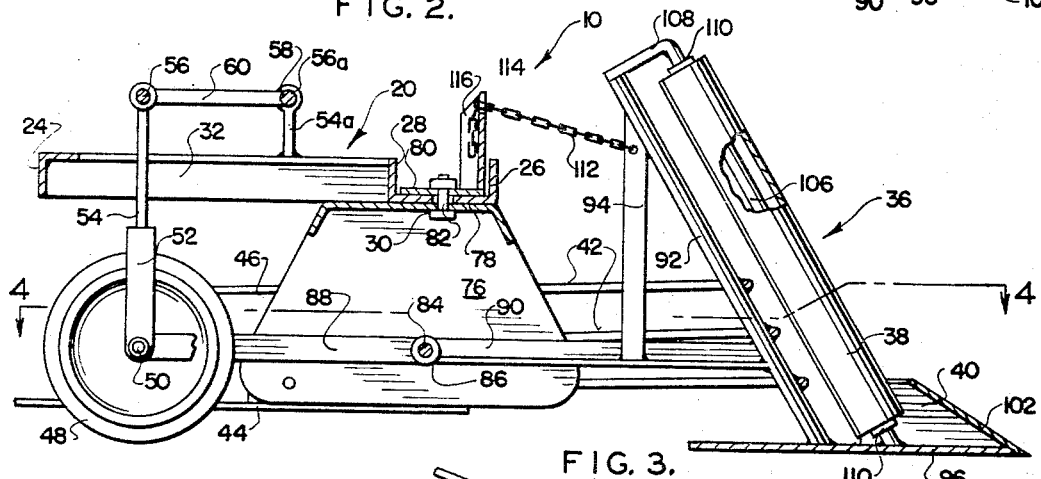
FIGURE 3 is a section to an enlarged scale taken along line 3—3 of FIGURE 1 having additional portions broken away to reveal the interior construction.

From the foregoing description and an examination of the drawings it is obvious that some additional structure must be provided to prevent the wheels 48 from moving out from underneath the frame due to their pivotal connection thereto and such additional structure can best be seen in FIGURES 3 and 4 to which reference will now be made. In FIGURE 3 it will be noted that frame elements 26 and 28 comprise angle irons arranged in spaced-parallel edge-to-edge relation to define an upwardly-opening channel having slot 30 running down the center. The track thus produced mounts on the underside thereof a pair of generally trapezoidal-shaped sideplates 76 arranged in transversely-spaced substantially parallel relation interconnected across their top edges by a horizotal connecting plate 78. A second horizontal plate 80 rests in the bottom of the channel formed by elements 26 and 28 and is connected through slot 30 to plate 78 by bolts 82 (FIGURE 3). The assemblies 76, 78 are thus transversely adjustable along the cutter frame.

Spaced forwardly of wheel axle 50 is a shaft 84 mounted between the sideplates 76 of at least the two outboard cutter bar subassemblies. As shown in FIGURE 1, three assemblies 36 have been shown which are capable of harvesting six rows at a time. The center assembly of the three has no wheel 48 associated therewith and, therefore, does not require the appurtenances connected thereto.

A sleeve 86 is rotatably mounted on shaft 84 and a pair of struts 88 extend rearwardly from the sleeve extremities to axle 50 where they are apertured to receive the latter. These struts 88 and sleeve 86 cooperate with shaft 84 to hold wheel 48 a fixed distance behind said shaft 84 throughout the range of vertically-adjustable movement provided by servo-motor 70.

Now in a six row harvesting machine that utilizes three functional assemblies 36 as shown in FIGURE 1, the center assembly is generally located at the midpoint of the frame and the outboard assemblies are adjusted transversely relative thereto in order to accommodate different row-spacings. When such adjustments are made, it is necessary to relocate sleeves 56 and their associated posts 54 and U-shaped elements 52 that support wheels 48 along the lateral portion of crank yoke 60 by loosening and refastening collars 62. While the distance separating the legs of yokes 60 determine the extent of lateral adjustment that can be made in assemblies 36, not much is needed in that twelve inches or so adjustment between each outboard assembly and the middle one is ample to cover the normal variations in the row-spacings of a bean crop. In any event, whatever adjustment is needed can be arranged for by providing a yoke 60 with a lateral leg of sufficient length and an appropriate spacing between elements 32 and 34 of the frame to accommodate same.

Figure 5:
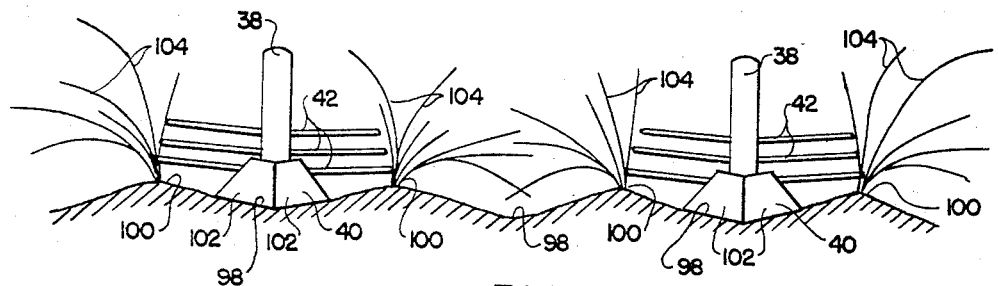
FIGURE 5 is a front elevation, somewhat diagrammatic, illustrating the manner in which each "untangling-plow" subassembly operates within alternate furrows to spread the vines on both sides thereof.
Figure 6:
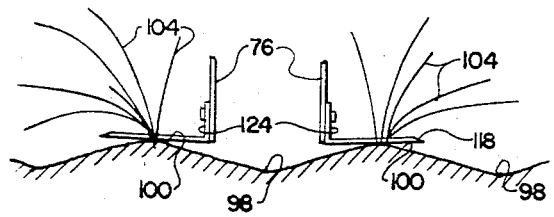
FIGURE 6 is a diagrammatic front elevation like FIGURE 5 except that the position of the cutter bars is shown in relation to the furrow and plants growing alongside thereof.
Figure 7:
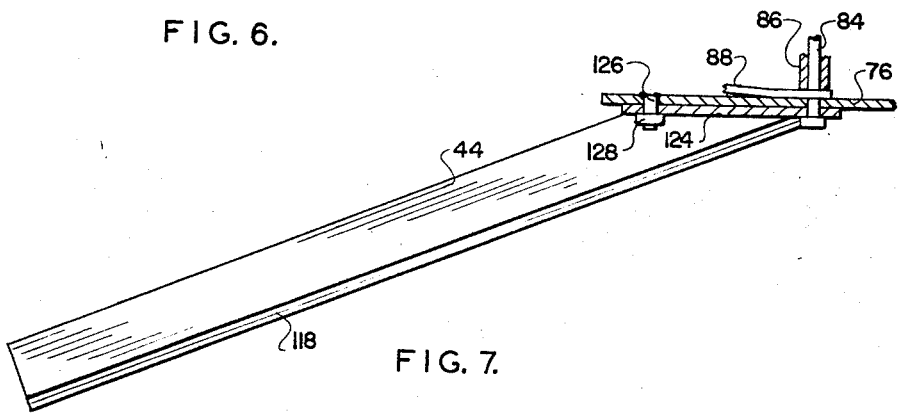
FIGURE 7 is an enlarged fragmentary section showing the cutter bar and mounting therefor.
Figure 8:
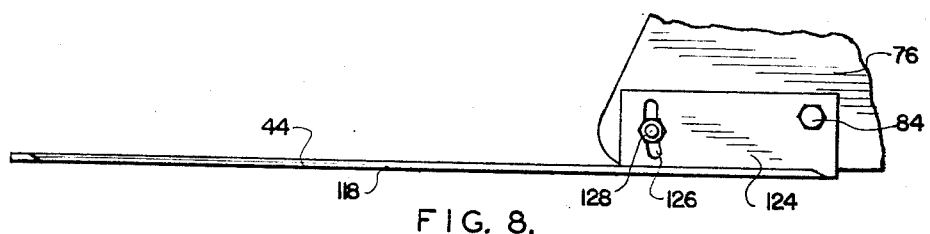
FIGURE 8 is a fragmentary side elevation showing the mounting of the cutter bars for pivotal adjustment; and, FIGURE 9 is a fragmentary detail showing the serrated cutter bar edge.

Projecting forwardly from the midpoint of sleeve 86 is a tongue 90 terminating in a downwardly and forwardly inclined rod 92. Brace 94 interconnects the upper end of this rod 92 to the tongue intermediate its ends providing additional structural rigidity. The lower end of rod 92 has a flat horizontal ground skid 96 mounted thereon which slides along the ground in the furrow 98 between the planted rows 100 as shown in FIGURE 5. The forwardmost extremity of the skidplate is V-shaped and mounts a pair of trapezoidal-shaped plates 102 that are joined together along their leading edges to form a plow element 40. This plow functions to lift the tangled vines 104 laying in the bottom of the furrow into position where they can be untangled by roller 38 that is freely rotatable on shaft 106 that parallels rod 92 in spaced relation forwardly thereof. The bottom end of shaft 106 is fastened atop skid plate 96 behind the plow element and the upper end is provided with a right angle bend 108 which enables same to be fastened to the top of rod 92. The ends of hollow cylindrical roller are closed except for central apertures to pass the shaft and collars 110 afixed to said shaft support the roller for rotation thereon.

Figure 4:
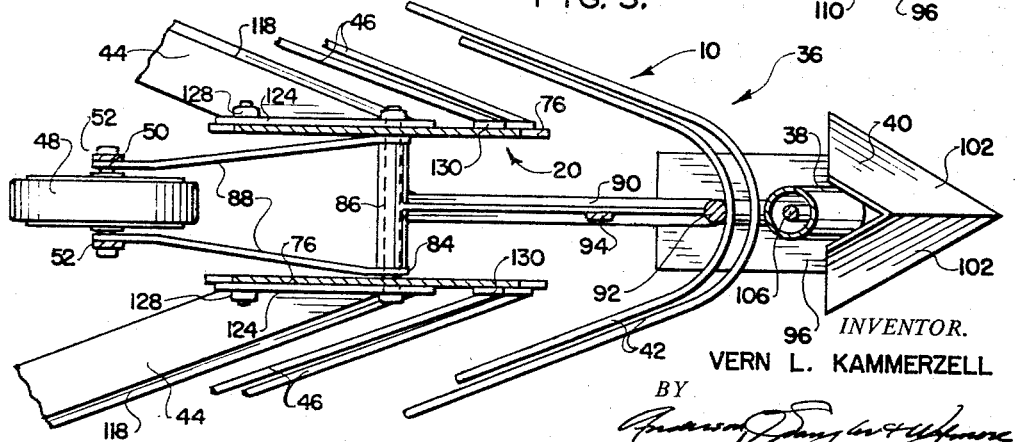
FIGURE 4 is a section taken along line 4—4 of FIGURE 3.

One or more generally V-shaped springable tines 42 are fastened to rod 92 in stacked horizontally-disposed position one above the other so that the legs thereof diverge rearwardly from both sides of roller 38 as revealed most clearly in FIGURE 4. This forward set of tines cooperates with roller 38 and plan element 40 to untangle and spread the vines apart into their respective rows prior to being cut as revealed most clearly in FIGURE 5. Tines 42 also guide the vines back onto cutter bars 44 and prevent them from entering the space between plates 76.

In FIGURES 1, 2 and 3, it can be seen that means are provided for adjusting the height of the vine-untangling subassembly just described independently of the cutter bars 44 and windrowing fingers 46. Such means comprises a short length of chain 112 fastened to brace 94 and extending rearwardly therefrom to a point where selected links thereof can be slipped into notch 114 (FIGURE 3) of latch post 116 mounted on the frame. Varying the effective length of the chain, of course, causes the vine untangling subassembly to pivot on shaft 84 and raise or lower relative to the ground.

Specifically with reference to FIGURE 5, it will be seen that the vine untangling subassemblies which include plow 40, roller 38 and tines 42, move along alternate furrows 98 with planted rows 100 on both sides thereof. The tangled vines laying in the bottom of the furrow are scooped up by the plow element and caused to ride up on roller 38 which turns in either direction and parts them without material damage thereto. Once the vines have been untangled by roller 38, they are parted by tines 42 and laid over onto their respective rows prior to being cut. The entire subassembly is free to ride up over rocks, clods of dirt and other obstructions that lie in the path of the plow even though the wheels remain in contact with the ground.

Figure 9:
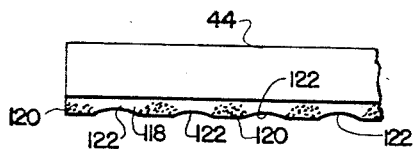

Next, particular attention is directed to FIGURES 1, 4 and 6–9, inclusive, of the drawing where the cutting and windrowing subassemblies are most clearly revealed. The cutter bars 44 comprise elongate strap metal blades having the leading edge 118 thereof sharpened and intermittently hardened in areas 120 spaced throughout its length as shown in FIGURE 9. This intermittent selective hardening has proven to be advantageous in that during use the portions 122 between the hardened areas 120 wear away faster than said hardened areas eventually resulting in a serrated edge as shown in FIGURE 9. This serrated or scalloped edge, in turn, has proven to possess superior cutting and wearing qualities not found in a straight knife edge or one that is continuously hardened.

Two blades are carried on each of the functional subassemblies 38 diverging rearwardly from the exposed faces of plates 76 to which they are attached. The tips of the blades are spaced apart laterally a distance well in excess of the spacing between the planted rows as shown quite clearly in FIGURE 6. Thus, as the harvester moves along the field with the cutter bars positioned to cut the plant or vine at approximately the juncture between the root and haulm, each plant in the rows alongside the furrow in which the vine-untangling plow moves will be cut.

The forward end of each cutter bar or share 44 is provided with an upturned flange 124 that is pivotally mounted adjacent its forward extremity on shaft 84. Rearwardly of this pivot point, plate 124 is provided with an arcuate slot 126 curved about shaft 84 as its center. Fastener 128 attached to plate 76 locks the cutter bar in adjusted position. The inclination of the cutter bar 44 relative to the ground can thus be adjusted independent of the vine-untangling subassembly.

FIGURES 1, 2 and 4 most clearly reveal the windrowing fingers 46 that stack the cut bean stalks in windrows atop their respective planting rows once they have been cut. Two such spring fingers or tines are mounted on a bracket 130 which is, in turn, secured to the plates 76 ahead of the cutter bars but behind fingers 42 as revealed most cleary in FIGURE 4. Tines 46, while they generally parallel both tines 42 and edge 118 of the cutter bar at a position intermediate thereof, are a good deal longer than the tines 42 so as to terminate at approximately the same point as the free cutter bar ends in FIGURE 1. By being placed outboard and slightly ahead of the cutter bar cutting edge, it is obvious that the vines will contact tines 46 before being cut. However, these tines lie spaced above the outer bars and they contact the plants above ground level moving this portion aside. Obviously, the tines are incapable of effecting the position of that portion of the plant which lies underground and, with the cutter bars adjusted to make the cut at or near ground level, the tines can have no effect on the actual harvesting operation. Immediately after the cut is made and the haulm is separated from the root, the tines 46 clear the furrow and stack the stalks in windrowed relation on the planting rows or in the intermediate furrow.

Finally, returning once again to FIGURES 1 and 2, the mechanism will be described by which the harvester unit is raised and lowered between its operative and inoperative positions. A pair of inclined struts 132 extend upwardly and inwardly along the rear edge of the rectangular frame from a point of attachment at the outboard extremities of rear transverse element 24. The inner ends of these struts 132 connect to the top of transversely-spaced uprights 134 (FIGURE 1) which are supported atop frame element 24. Braces 136 slope downwardly from the junction between frame elements 132 and 134 to front transverse frame element 26. A spacer element 138 spans the gap separating the junction of elements 132, 134 and 136.

A pair of upstanding ears 140 are provided at these same junctures and the forward extremities of links 142 are pivotally attached thereto while the rear ends of the latter elements are fixedly attached to the ends of crank rod 144 that mounts for rotation between mounting brackets 14. Links 142 lie in transversely spaced parallel relation to one another and their axes of pivotal movement are in longitudinally-spaced parallel relation.

Brackets 14 include a downturned leg 146 paralleling uprights 134 as shown in FIGURE 2. Parallel links 148 lying in spaced parallel relation beneath links 142 are pivotally attached to leg 146 of bracket 14 and to upright 134, as shown in FIGURE 2. Parallel links 148 lying in spaced parallel relation beneath links 142 are pivotally attached to leg 146 of bracket 14 and to upright 134. Thus, legs 146, uprights 134 and links 142 and 148 together with the pivotal connections at the corners thereof constitute a parallelogram connection between the harvester attachment and the tractor capable of raising the former in parallel relation to the ground. Tension springs 150 connected between the rear lower pivot 152 and front upper pivot 154 bias the harvester unit into operative ground-engaging relation.

Raising of the harvester unit into its upper or inoperative position is accomplished by means of a second hydraulic servo-motor 156 (FIGURE 2) that interconnects bracket 158 on the tractor frame with crank arm 160 attached fixedly to one end of crank rod 144. This servo-motor 156 is connected by means of hydraulic lines 162 and 164 to the tractor's hydraulic system. Introducing fluid under pressure into line 162 causes the piston rod 166 to retract raising the entire harvester attachment up off the ground against the action of springs 150.

Having thus described the several useful and novel features of the bean cutter attachment of the present invention, it will be apparent that the many worthwhile objectives for which it was designed have been achieved. Although but a single specific embodiment of the invention has been illustrated and described herein, I realize that certain changes and modifications may well occur to those skilled in the art within the broad teaching hereof; hence, it is my intention that the scope of protection afforded hereby shall be limited only insofar as said limitations are specifically set forth in the appended claims.

What is claimed is:

1. A bean harvesting device for attachment to a farm tractor of the type having a self-contained source of hydraulic power available for operating accessories which comprises: a transversely elongate horizontally disposed main frame having a parallelogram linkage for connecting same to the front end of a farm tractor for movement in substantially parallel relation to the ground between a lower operative position and a raised inoperative position, said main frame including a pair of transverse elements cooperating to define an implement-supporting track; implement deactivating means connected to the main frame and connectable to the tractor, said implement deactivating means being operative upon actuation to shift the main frame between its operative and inoperative positions; at least two implement-carrying subframes having a pair of transversely-spaced sideplates interconnected by a transverse horizontal shaft suspended beneath the main frame and connected within the track thereof for relative movement in a direction to vary the spacing therebetween; means for supporting the main frame for rolling engagement over the ground when in operative position, said means including ground-engaging wheels mounted for rotation about transverse axes displaced rearwardly in spaced substantially parallel relation to the subframe shafts of the outboard subframes, link means connecting each wheel to its adjacent subframe for transverse adjustment therewith and to its shaft for arcuate movement about said shaft as an axis, and frame-elevating means interconnecting the wheels and main frame adapted upon actuation to vary the spacing therebetween when the latter is in operative position; first hydraulic servo-motor means connected to the frame-elevating means operative upon connection to the tractor's hydraulic system to vary the height at which the main frame moves over the ground; a vine-untangling subassembly projecting forwardly from each subframe and attached to the shaft thereof for independent arcuate movement about the latter as an axis, said subassembly including a sleeve mounted on the subframe shaft for rotational movement, a tongue projecting forwardly from said sleeve, a ground-engaging skid plate on the forward end of the tongue, a pair of plates mounted atop the skid plate and joined together at their leading edges in a generally V-shaped configuration to form a plan element, a roller shaft extending upwardly and rearwardly from atop the skid plate behind the plan element, a roller mounted for rotational movement on the roller shaft, and at least one generally V-shaped vine-separating tine having the apex thereof fastened behind the roller with its legs diverging rearwardly in position to sweep vines out of the path of the subframe following along therebehind; means adjustably interconnecting the main frame and vine-entangling subassembly for raising and lowering the latter; a vine-cutting subassembly for severing the bean vine haulms from their roots in adjacent planted rows while moving along a furrow therebetween, said subassembly including a pair of elongate flat cutter bars projecting in from opposite sides of each subframe in rearwardly divergent relation, each of said cutter bars having the leading edge thereof sharpened and its forward end attached to the adjacent sideplate for limited pivotal adjustment to vary the inclination of the blade relative to the ground; and, a windrowing subassembly for stacking the severed vine haulms in windrows atop their respective planting rows, said subassembly including a pair of elongate spring-able tines attached to opposite sides of each subframe in spaced substantially parallel relation above the cutter bars.

2. The bean harvesting device as set forth in claim 1 in which: the implement deactivating means comprises a second hydraulic servo-motor pivotally connected to the main frame and connectable to the tractor's hydraulic system.

3. The bean harvesting device as set forth in claim 1 in which: the parallelogram linkage of the main frame includes a front pair of uprights rigidly attached to the main frame in transversely-spaced substantially parallel relation, a rear pair of uprights attachable to the tractor in spaced substantially parallel relation to one another and the front pair of uprights, an upper pair of links pivotally interconnecting the upper ends of the front and rear pairs of uprights, a lower pair of links pivotally interconnecting the lower ends of the front and rear pairs of uprights in spaced parallel relation beneath the upper pair of links, a crankshaft rigidly interconnecting one of said upper and lower pairs of links along the pivot axis of the latter with the rear pair of uprights, and a crank arm rigidly connected to the crankshaft and pivotally attached to the implement deactivating means.

4. The bean harvesting device as set forth in claim 1 in which: the ground-engaging wheels have a common axis of rotation extending transversely of the main frame, and in which the subframe shafts are arranged coaxially in spaced parallel relation ahead of the common axis of wheel rotation.

5. The bean harvesting device as set forth in claim 1 in which: the frame-elevating means comprises a crankshaft mounted for rotation transversely of the main frame, U-shaped crank yokes rigidly attached to the crankshaft projecting out over each wheel, a wheel-mounting yoke journalling the wheel for rotation at its lower end and pivotally attached to the cross-bar of the crank yoke at its upper end for transverse adjustment with the subframe, and a crank arm having one end rigidly attached to the crankshaft and its other end pivotally connected to the first hydraulic servo-motor means.

6. The bean harvesting device as set forth in claim 1 in which: each vine-untangling subassembly includes more than one V-shaped tine arranged in stacked relation one above the other.

7. The bean harvesting device as set forth in claim 1 in which: three subframes are suspended beneath the main frame, one on each end and the third in the center, each said subframe including vine-untangling, vine-cutting and windrowing subassemblies, and only the two outboard subframes being equipped with wheels.

8. The bean harvesting device as set forth in claim 1 in which: the sharpened edges of the cutter bars are selectively hardened in areas spaced throughout the length thereof leaving relatively softer portions therebetween, said softer portion being adapted to wear more rapidly than the hardened portions during repeated use so as to result in a serrated cutting edge.

References Cited

UNITED STATES PATENTS

| 1,789,563 | 1/1931 | Quinan | 56—229 |
| 2,614,376 | 10/1952 | Madsen | 56—229 |
| 2,653,436 | 9/1953 | Warner | 56—119 |

ABRAHAM G. STONE, Primary Examiner.

P. A. RAZZANO, Assistant Examiner.

U.S. Cl. X.R.

56—119